United States Patent
Yi et al.

(10) Patent No.: US 10,759,300 B2
(45) Date of Patent: Sep. 1, 2020

(54) VEHICLE AND CONTROL METHOD THEREOF

(71) Applicant: Hyundai Motor Company, Seoul (KR)

(72) Inventors: Kichang Yi, Suwon-si (KR); Hyoung Shin, Yongin-si (KR); Youngwook Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 763 days.

(21) Appl. No.: 15/477,820

(22) Filed: Apr. 3, 2017

(65) Prior Publication Data

US 2018/0118186 A1 May 3, 2018

(30) Foreign Application Priority Data

Oct. 31, 2016 (KR) .................. 10-2016-0143034

(51) Int. Cl.
| | |
|---|---|
| *B60W 10/26* | (2006.01) |
| *B60W 10/30* | (2006.01) |
| *B60L 58/10* | (2019.01) |
| *B60L 58/20* | (2019.01) |
| *B60W 10/24* | (2006.01) |

(52) U.S. Cl.
CPC ............. *B60L 58/10* (2019.02); *B60L 58/20* (2019.02); *B60W 10/26* (2013.01); *B60W 10/30* (2013.01); *B60W 10/24* (2013.01); *Y02T 10/7005* (2013.01); *Y02T 10/7066* (2013.01); *Y02T 90/16* (2013.01)

(58) Field of Classification Search
CPC .......... B60L 58/10; B60L 58/14; B60L 58/20; B60W 10/26; B60W 10/30; B60W 10/24; Y02T 10/7005; Y02T 10/7066; Y02T 90/16

USPC ......................................... 307/9.1, 10.1–10.7
See application file for complete search history.

(56) References Cited

U.S. PATENT DOCUMENTS

| | | | | | |
|---|---|---|---|---|---|
| 5,569,997 | A | * | 10/1996 | Berger ..................... | H02J 9/061 307/66 |
| 2012/0265923 | A1 | * | 10/2012 | Kuo ........................ | G11C 16/10 711/103 |
| 2014/0163777 | A1 | * | 6/2014 | Yashiro ................... | B60L 53/64 701/2 |
| 2014/0214242 | A1 | * | 7/2014 | Seo .......................... | B60L 1/02 701/2 |

(Continued)

FOREIGN PATENT DOCUMENTS

| | | | |
|---|---|---|---|
| JP | 2006174619 | * | 6/2006 |
| JP | 2010-200552 A | | 9/2010 |
| JP | 2013-009517 A | | 1/2013 |

(Continued)

*Primary Examiner* — Rexford N Barnie
*Assistant Examiner* — Toan T Vu
(74) *Attorney, Agent, or Firm* — Morgan, Lewis & Bockius LLP

(57) ABSTRACT

A vehicle may include an auxiliary battery to prevent full discharge of a main power source while remotely controlling electronic devices of the vehicle, wherein the vehicle may include a communication device configured to receive a control signal indicating a control command from a mobile device; a controller configured to control a target of control based on the control signal; and a power management device including an auxiliary battery and configured to supply power to the controller using the auxiliary battery when the communication device receives the control signal while an ignition of the vehicle is turned off.

16 Claims, 10 Drawing Sheets

(56) References Cited

U.S. PATENT DOCUMENTS

2014/0277887 A1    9/2014  Slattery et al.
2017/0021835 A1*   1/2017  Kojima .................... G07C 5/08

FOREIGN PATENT DOCUMENTS

| KR | 10-2004-0097116 A | 11/2004 |
| KR | 10-2010-0024547 A | 3/2010 |
| KR | 10-1080059 B1 | 11/2011 |
| KR | 10-2013-0032115 A | 4/2013 |
| KR | 10-1532404 B1 | 6/2015 |

* cited by examiner

< WHILE RUNNING >

< IGNITION TURNED OFF >

< CONTROLLER TURNED OFF >

< SIGNAL RECEIVED >

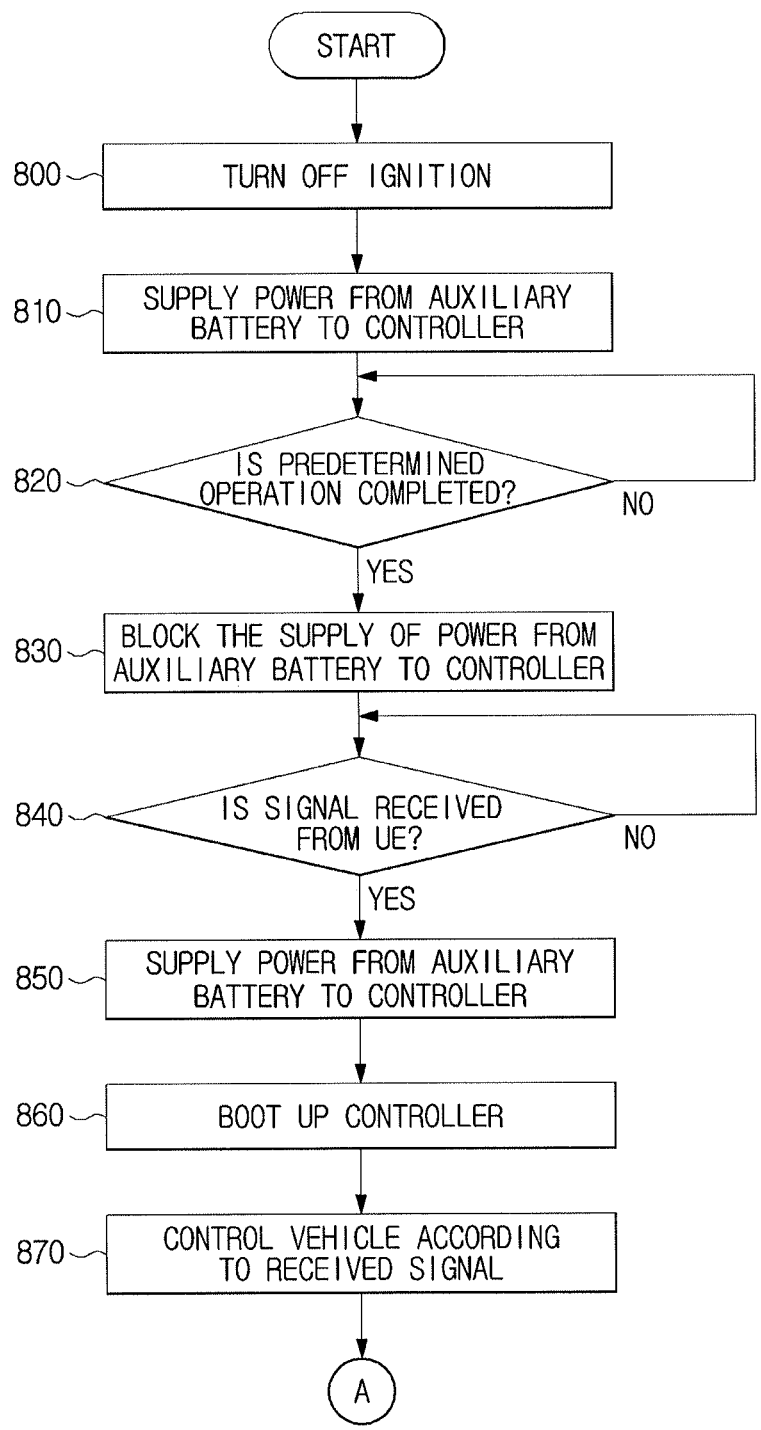

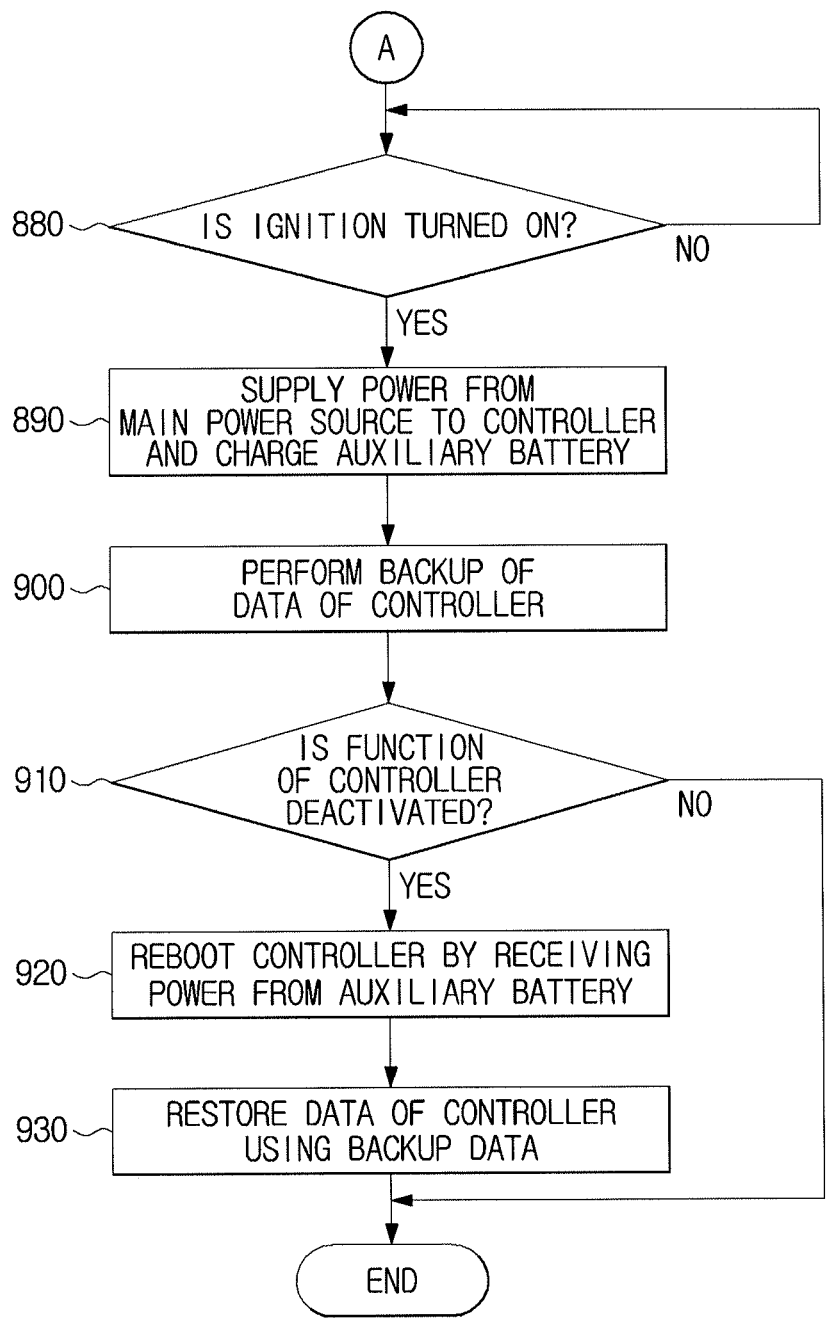

VEHICLE AND CONTROL METHOD THEREOF

CROSS-REFERENCE TO RELATED APPLICATION(S)

The present application claims the benefit of Korean Patent Application No. 10-2016-0143034, filed on Oct. 31, 2016 in the Korean Intellectual Property Office, the disclosure of which is incorporated herein by reference.

BACKGROUND OF THE INVENTION

Field of the Invention

Embodiments of the present invention relate to vehicles.

Description of Related Art

In general, vehicles are transportation apparatuses travelling on roads or railroads by using fossil fuels, electricity, and the like, as a power source.

Recently, vehicles have been equipped with various electronic devices for the safety and convenience of drivers in addition to providing transportation functions. For example, a vehicle may be equipped with various devices for convenience including an air conditioner to control indoor temperature of the vehicle, power windows to control side windows using buttons, and power seats to control angles of backrests.

However, since these devices for convenience are controlled by buttons disposed in the vehicle, a user needs to be fully aware of functions of the buttons to control the devices for convenience.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle including an auxiliary battery to prevent full discharge of a main power source while remotely controlling electronic devices of the vehicle.

Additional aspects of the disclosure will be set forth in part in the description which follows and, in part, will be obvious from the description, or may be learned by practice of the disclosure.

In accordance with one aspect of the present invention, a vehicle including: a communication device configured to receive a control signal indicating a control command from a mobile device; a controller configured to control a target of control based on the control signal; and a power management device including an auxiliary battery and configured to supply power to the controller using the auxiliary battery when the communication device receives the control signal while an ignition of the vehicle is turned off.

The controller receives power from a main power source of the vehicle when the ignition of the vehicle is turned on.

The power management device blocks the supply of power from the auxiliary battery when the ignition of the vehicle is turned on.

The power management device switches the auxiliary battery into a charging state when the ignition of the vehicle is turned on.

The vehicle further includes a memory configured to perform a backup of data of the controller, wherein the power management device downloads data related to control of the vehicle from the controller and stores the data in the memory while the ignition of the vehicle is turned on.

When the data stored in the controller is lost, the power management device uploads the lost data based on the data stored in the memory to the controller When functions of the controller are deactivated and data stored in the controller is lost, the power management device boots the controller by supplying power to the controller using the auxiliary battery and uploads the lost data based on the data stored in the memory to the controller.

When functions of the controller are deactivated, the power management device boots the controller by supplying power to the controller using the auxiliary battery.

When the communication device receives the control signal while the ignition of the vehicle is turned off, the power management device boots the controller by supplying power to the controller using the auxiliary battery.

The power management device supplies power to the controller using the auxiliary battery until the controller completes predetermined operation and blocks the supply of power to the controller upon completion of the operation while the ignition of the vehicle is turned off.

In accordance with one aspect of the present invention, a method of controlling a vehicle, the method including: determining whether or not a control signal is received from a mobile device when the ignition of the vehicle is turned off; and supplying power from an auxiliary battery to the controller of the vehicle by a power management device of the vehicle.

The method further includes supplying power from a main power source to the controller when the ignition of the vehicle is turned on.

The method further includes blocking the supply of power from the auxiliary battery by the power management device when the ignition of the vehicle is turned on.

The method further includes switching the auxiliary battery to a charging state when the ignition of the vehicle is turned on.

The method further includes downloading data related to control of the vehicle from the controller by the power management device of the vehicle and storing the data in a memory when the ignition of the vehicle is turned on.

The method further includes uploading the lost data based on the data stored in the memory to the controller by the power management device when data stored in the controller is lost.

The method further includes: booting the controller by supplying power to the controller using the auxiliary battery by the power management device; and uploading the lost data based on the data stored in the memory to the controller by the power management device when functions of the controller are deactivated and data stored in the controller is lost.

The method further includes booting the controller by supplying power to the controller using the auxiliary battery by the power management device when functions of the controller are deactivated.

The supplying of power to the controller of the vehicle includes booting the controller by supplying power to the controller using the auxiliary battery by the power management device of the vehicle upon receiving the control signal from the mobile device.

The method further includes: supplying power to the controller using the auxiliary battery until the controller completes predetermined operation by the power management device; and blocking the supply of power to the controller upon completion of the operation by the power management device, while the ignition of the vehicle is turned off.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9 and FIG. 10 are flowcharts illustrating a method of controlling a vehicle according to an embodiment.

Figure 1:
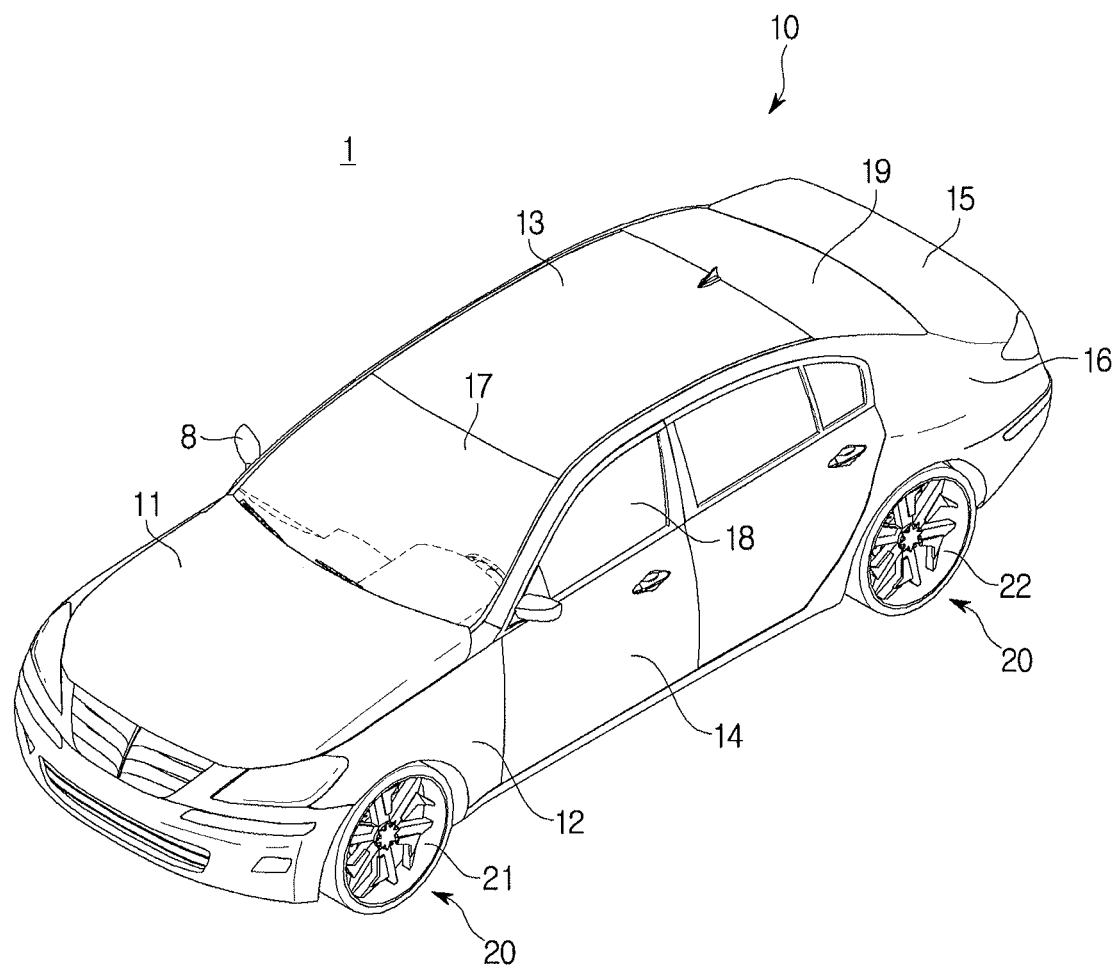
FIG. 1 is an exterior view of a vehicle according to an embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention may, however, be embodied in many different forms and should not be construed as being limited to the embodiments set forth herein; rather, these embodiments are provided so that this disclosure will be thorough and complete, and will fully convey the concept of the disclosure to those of ordinary skill in the art.

The terms used in the present specification are merely used to describe particular embodiments, and are not intended to limit the present invention.

As used herein, the singular forms "a", "an" and "the" are intended to include the plural forms as well, unless otherwise stated.

In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms.

In addition, the terms "unit", "device," "block", "member", and "module" used herein refer to a unit used to process at least one function or operation. For example, these terms may refer to one or more hardware components including field-programmable gate array (FPGA) or application specific integrated circuit (ASIC), one or more software components stored in a memory, or one or more processors.

Figure 2:
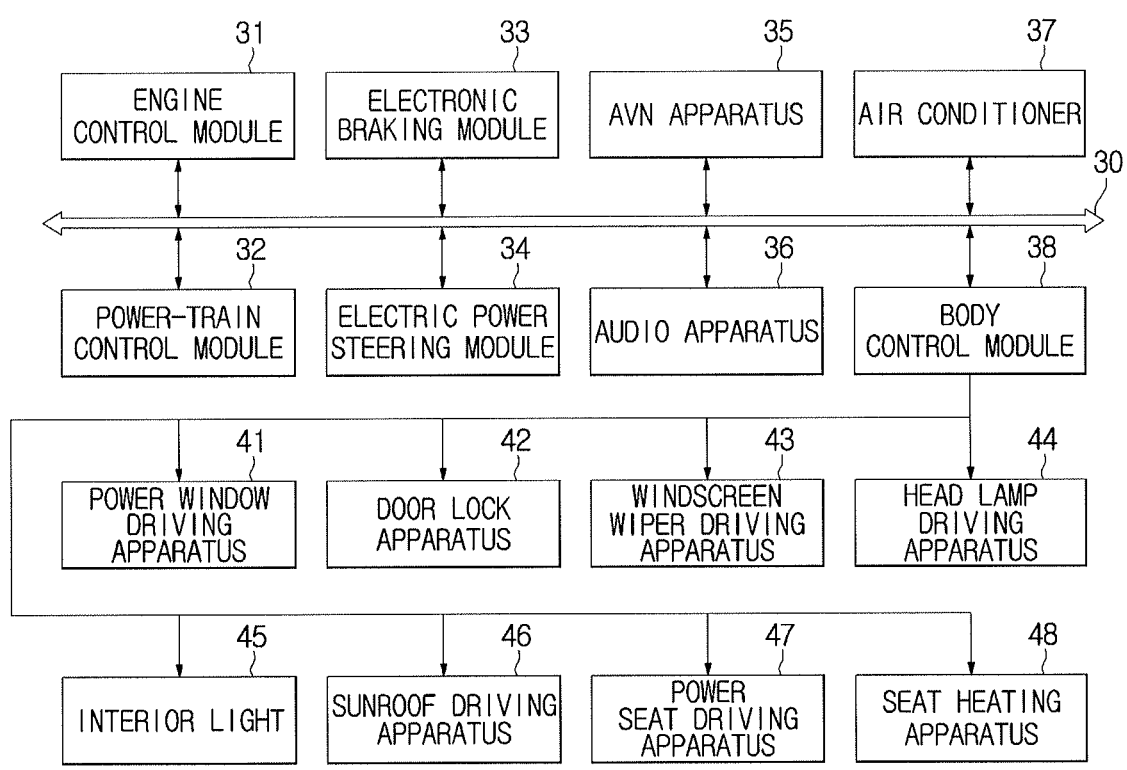
FIG. 2 is a diagram illustrating electronic devices of the vehicle.
Figure 3:
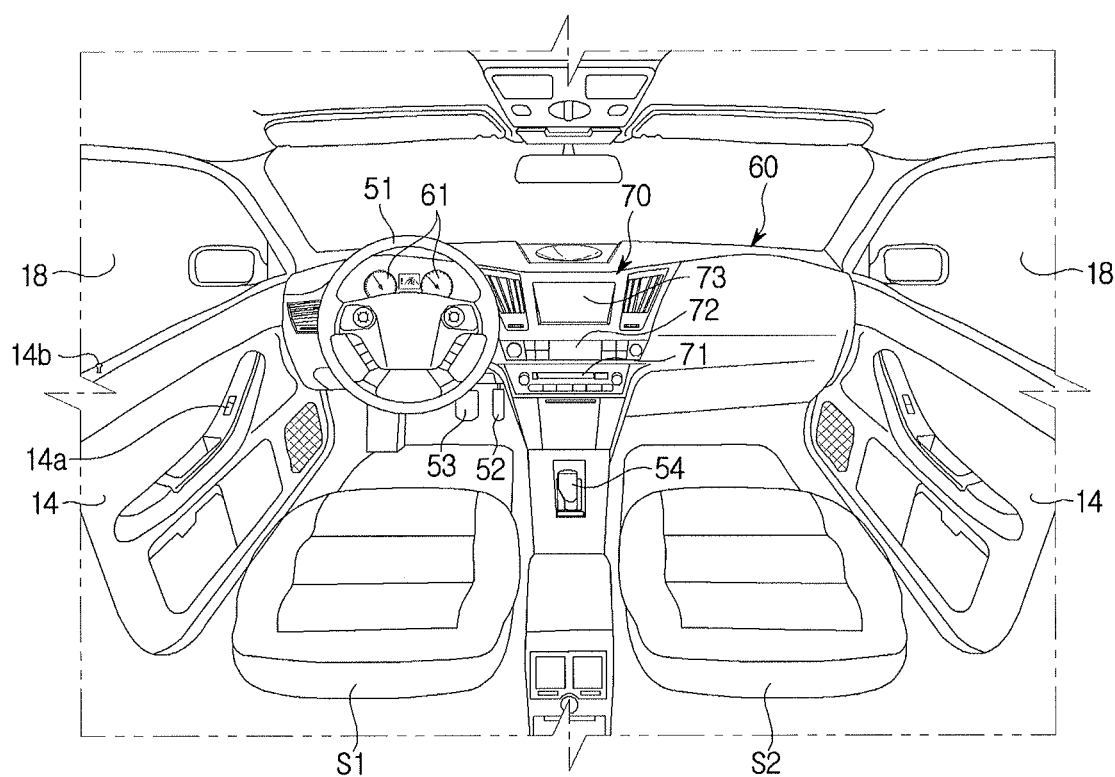
FIG. 3 is an interior view of the vehicle.

FIG. 1 is an exterior view of a vehicle according to an embodiment. FIG. 2 is a diagram illustrating electronic devices of the vehicle. FIG. 3 is an interior view of the vehicle.

As illustrated in FIG. 1, a vehicle 1 includes a body 10 defining an appearance of the vehicle 1 and accommodating various parts and wheels 20 configured to move the vehicle 1.

The body 10 may include a hood 11, front fenders 12, a roof panel 13, doors 14, a trunk lid 15, quarter panels 16, and the like to form an indoor space where a driver stays. Also, a front window 17 may be disposed at a front portion of the body 10, and side windows 18 may be disposed at sides of the body 10 to provide the driver with views. A rear window 19 may also be disposed at a rear portion of the body 10.

The body 10 may include a power generation apparatus, a power transmission apparatus, a steering apparatus, a brake apparatus, and the like to operate the vehicle 1. The power generation apparatus generating a rotational force of the wheels 20 may include an engine, a fuel supply apparatus, a cooling apparatus, an exhaust apparatus, an ignition apparatus, and the like. The power transmission apparatus transmitting the rotational force generated by the power generation apparatus to the wheels 20 may include a clutch, a gearshift lever, a transmission, a differential gear device, a drive shaft, and the like. The steering apparatus controlling a proceeding direction of the vehicle 1 may include a steering wheel, a steering gear, a steering link, and the like. The brake apparatus stopping rotation of the wheels 20 may include a brake pedal, a master cylinder, a brake disc, a brake pad, and the like.

The wheels 20 include front wheels 21 disposed at front portions of the vehicle 1 and rear wheels 22 disposed at rear portions of the vehicle 1. The vehicle 1 may move forward and backward by rotation of the wheels 20.

The vehicle 1 may further include various electronic devices for the safety and convenience of the driver and occupants in addition to the aforementioned mechanical devices.

For example, the vehicle 1 may include an engine control module 31, a power-train control module 32, an electronic braking module 33, an electric power steering module 34, an Audio/Video/Navigation (AVN) apparatus 35, an audio apparatus 36, an air conditioner 37, and a body control module 38 as illustrated in FIG. 2.

The engine control module 31 controls fuel injection, gas mileage feedback, lean combustion, ignition timing, idle RPM, and the like.

The power-train control module 32 controls shifting of gears, damper clutch, pressure during On/Off operation of frictional clutch, engine torque during shifting of gears, and the like.

The electronic braking module 33 controls the brake apparatus of the vehicle 1 and may include an anti-lock brake system (ABS).

Also, the electric power steering module 34 may assist steering manipulation of a user by reducing a steering force during low-speed driving or parking and by increasing the steering force during high-speed driving.

The AVN apparatus 35 may output music or images in accordance with a user's input or display a route to a destination input by the driver. The audio apparatus 36 may reproduce sounds stored in a storage medium including a compact disk (CD) or receive and play radio programs. The air conditioner 37 may heat or cool air in the vehicle 1 in accordance with an indoor temperature of the vehicle 1.

The body control module 38 may control operation of a power window driving apparatus 41, a door lock apparatus 42, a windscreen wiper driving apparatus 43, a head lamp driving apparatus 44, internal lights 45, a sunroof driving apparatus 46, a power seat driving apparatus 47, a seat heating apparatus 48, and the like disposed in the vehicle 1.

In this regard, the electronic devices of the vehicle 1 may communicate with each other via a vehicle communication network 30.

For example, the engine control module 31, the power-train control module 32, the electronic braking module 33, the electric power steering module 34, the AVN apparatus 35, the audio apparatus 36, the air conditioner 37, and the body control module 38 may exchange data via the vehicle communication network 30. Also, the power window driving apparatus 41, the door lock apparatus 42, the windscreen wiper driving apparatus 43, the head lamp driving apparatus 44, the internal lights 45, the sunroof driving apparatus 46, the power seat driving apparatus 47, the seat heating apparatus 48 may also communicate with the body control module 38 via the vehicle communication network 30.

In the instant case, the vehicle communication network 30 may employ communication protocols including Media Oriented Systems Transport (MOST) offering a bit rate up to 24.5 megabits/second (Mbps), FlexRay offering a bit rate up to 10 Mbps, Controller Area Network (CAN) offering a bit rate of 125 kilobits/second (kbps) to 1 Mbps, and Local Interconnect Network (LIN) offering a bit rate of 20 kbps. The vehicle communication network 30 may use not only a single communication protocol including MOST, FlexRay, CAN, and LIN but also a plurality of communication protocols.

An indoor space where the driver and occupants stay may be provided in the vehicle 1 and various input devices and output devices to allow the driver to control the vehicle 1 may be disposed in the vehicle 1.

For example, the interior of the body 10 may include first and second seats S1 and S2 for a driver and an occupant, a steering wheel 51 to control a proceeding direction of the vehicle 1, an acceleration pedal 52 to control a speed of the vehicle 1, a brake pedal 53 to control braking of the vehicle 1, a gearshift lever 54 to shift gears of the vehicle 1 as illustrated in FIG. 3.

Also, the interior of the vehicle 1 may be provided with a dashboard 60 in which an instrument cluster and a control panel are disposed and a center fascia 70.

The dashboard 60 may be a laterally extending panel shape in front of the driver. The dashboard 60 may be provided with an instrument cluster 61 to display information related to driving of the vehicle 1, the steering wheel 51 to control the proceeding direction of the vehicle 1, and an airbag to protect the user in a case of collisions.

The center fascia 70 may extend downward from a central portion of the dashboard 60. The center fascia 70 may be provided with an audio control panel 71 to control the audio apparatus 36, an air conditioner control panel 72 to control the air conditioner 37, and a display panel 73 of the AVN apparatus 35 to display a route to the destination to the user or output sounds and images.

The driver or occupant may control operation of the vehicle 1 by using various input devices disposed in the vehicle 1. For example, the driver may drive the vehicle 1 via the acceleration pedal 62 and control the proceeding direction of the vehicle 1 via the steering wheel 60.

Furthermore, the driver may control the audio apparatus 36 by using the audio control panel 71 or control the air conditioner 37 by using the air conditioner control panel 72. Also, the driver may raise or lower the side windows 18 by using window switches 14a disposed at the doors 14 or lock or unlock the doors 14 by using door lock switches 14b.

As described above, the driver or occupant may also control the electronic devices of the vehicle 1 including the power window driving apparatus 41, the door lock apparatus 42, the windscreen wiper driving apparatus 43, the head lamp driving apparatus 44, the internal lights 45, the sunroof driving apparatus 46, the power seat driving apparatus 47, the seat heating apparatus 48 as well as main apparatus related to driving of the vehicle 1 by using various input devices disposed in the vehicle 1.

The driver or occupant may also control the electronic devices of the vehicle 1 by using a mobile device UE in addition to the various input devices disposed in the vehicle 1.

Hereinafter, a vehicle control system to control electronic devices of the vehicle 1 using the mobile device UE will be described.

Figure 4:
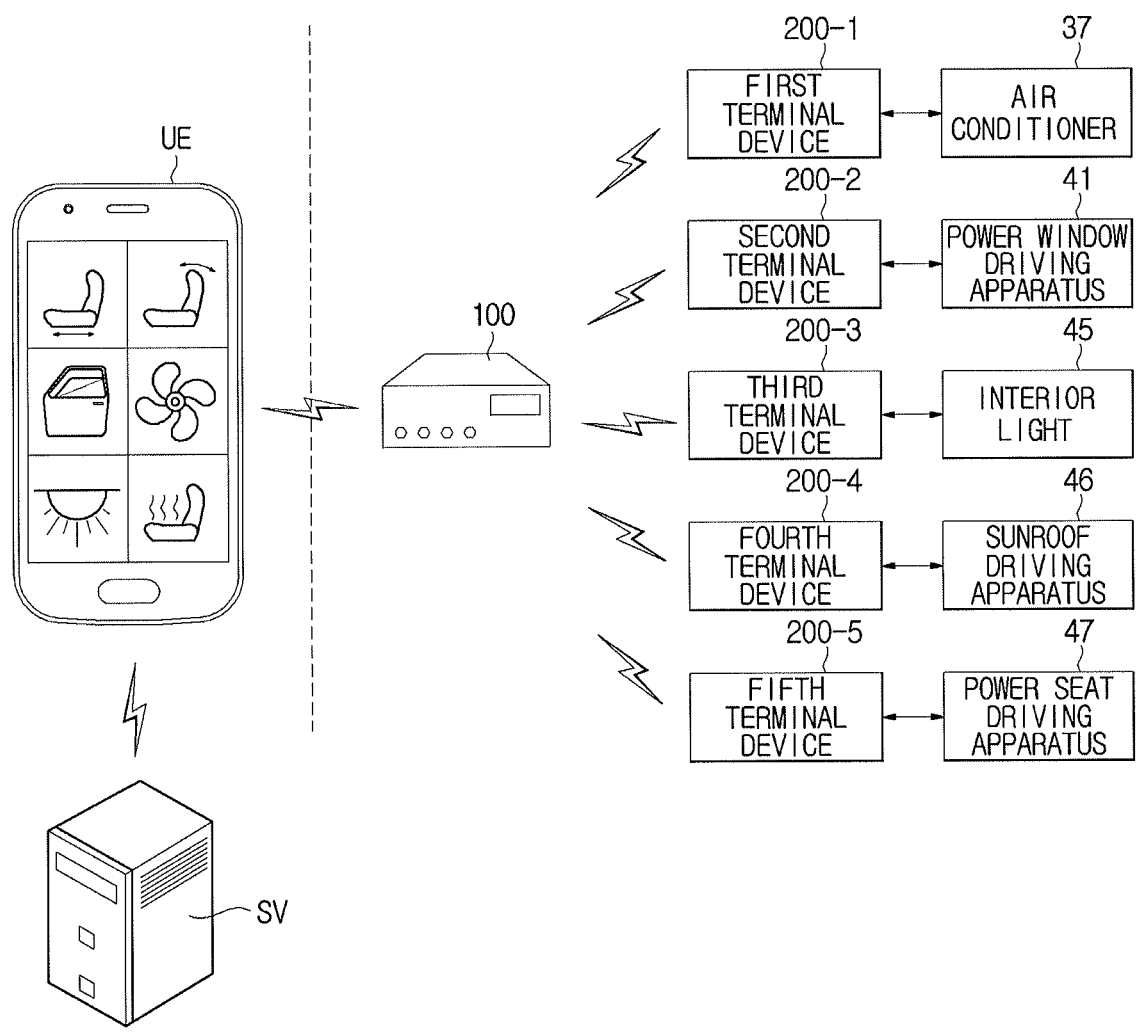
FIG. 4 is a diagram illustrating a vehicle control system according to an embodiment.
Figure 5:
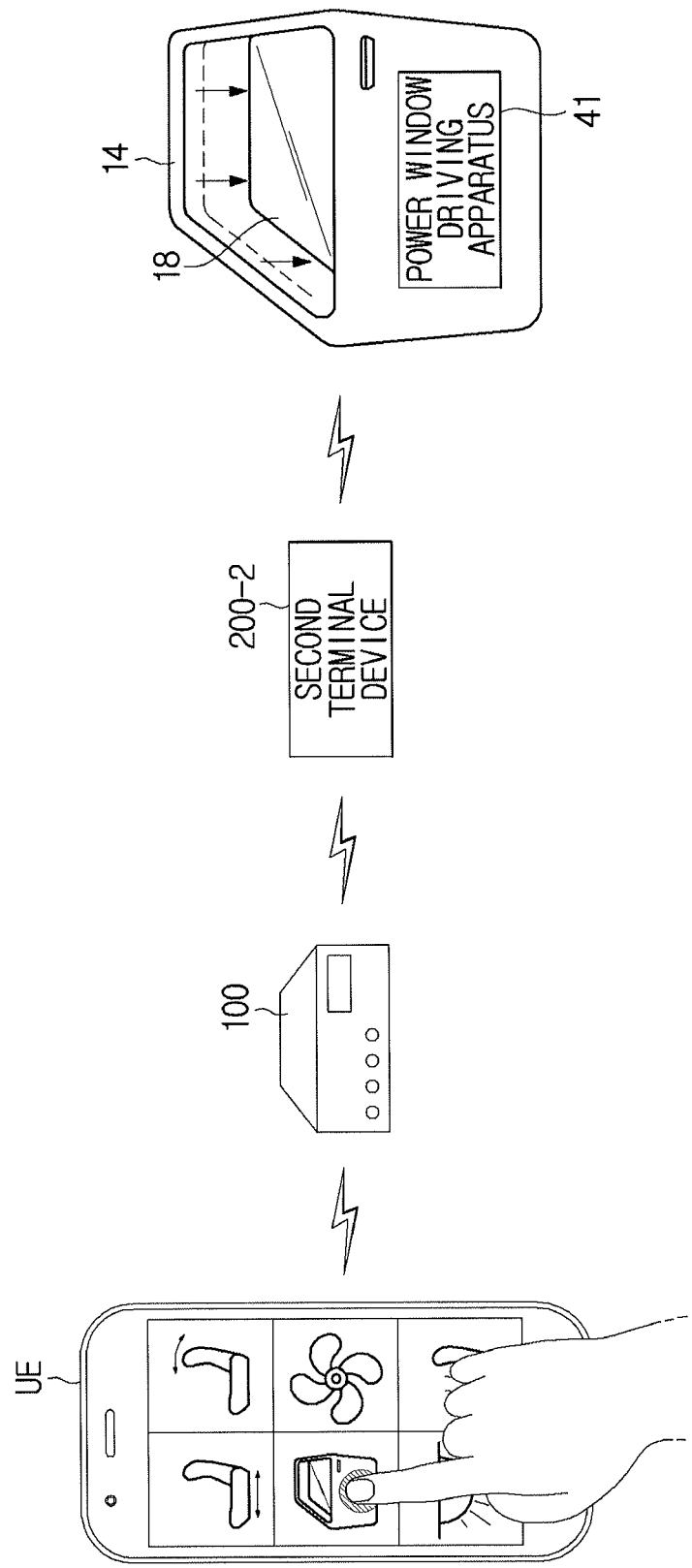
FIG. 5 is a diagram illustrating an example of controlling a vehicle by the vehicle control system.

FIG. 4 is a diagram illustrating a vehicle control system according to an embodiment. FIG. 5 is a diagram illustrating an example of controlling a vehicle by the vehicle control system.

As illustrated in FIG. 4, a vehicle control system 90 may include a control device 100 configured to receive a control signal corresponding to a control command of the driver from the mobile device UE, and a plurality of terminal devices 200 (200-1, 200-2, 200-3, 200-4, and 200-5) configured to output electric signals corresponding to the control command of the driver to electronic devices of the vehicle 1.

The control device 100 may receive the control command of the driver from the mobile device UE of the driver and transmit the received control command to at least one of the plurality of terminal devices 200 via a wireless or wired communication network. Also, the control device 100 may receive information of operation states of the electronic devices of the vehicle 1 from the plurality of terminal devices 200 and transmit the information to the mobile device UE of the driver.

The mobile device UE may include any devices allowing the driver to control the electronic devices of the vehicle 1 and communicate with the control device 100. For example, the mobile device UE may be a cellular phone, a personal communication service, a personal digital assistant (PDA), and a remote controller, and may also be any device communicating therewith regardless of names thereof.

The mobile device UE may display a user interface including a control command to control an electronic device of the vehicle 1. For example, mobile device UE may display a user interface including a seat move command to move the seat S1 or S2 of the vehicle forward and backward, a backrest control command to control an angle of a backrest of the seat S1 or S2, a side window up/down command to raise or lower a side window 18 of the vehicle 1, an air-condition control to control operation of the air conditioner 37, an internal light on/off command to turn on/off the internal lights 45, and a seat heat on/off command to turn on/off heating wires of the seat S1 or S2. Also, the driver may input the control command to the electronic device of the vehicle 1 via the user interface displayed on the mobile device UE.

Also, the mobile device UE may transmit a first control signal indicating the driver's control command to the control device 100 via a wireless or wired communication network. For example, as illustrated in FIG. 5, when the driver inputs a control command to raise the side window 18 via the mobile device UE, the mobile device UE may transmit the first control command indicating the input control command to the control device 100.

Also, the mobile device UE may communicate with a server device SV. The server device SV may manage the control device 100 and the terminal device 200 via the mobile device UE. The control device 100 may receive the first control signal indicating the driver's control command from the mobile device UE of the driver and process the received first control signal. The control device 100 may create a second control signal based on a target electronic device of the control command and the content of the control command included in the first control signal. For example, when the driver inputs the control command to raise the side window 18 as illustrated in FIG. 5, the control device 100 may determine the target of the control command as the power window driving apparatus 41 and the content of the control command as raising the side window 18 based on the first control signal.

The control device 100 may create the second control signal indicating the target electronic device and the content of the control command and transmit the second control signal to the plurality of terminal devices 200. For example, when the driver inputs the control command to raise the side window 18 as illustrated in FIG. 5, the control device 100 may create a second control signal indicating that the target is the power window driving apparatus 41, and the content of the control command is to raise the side window 18 and transmit the created second control signal to the plurality of terminal devices 200.

Also, the control device 100 may receive a first state signal indicating an operation state of an electronic device of the vehicle 1 from the terminal device 200 and transmit a second state signal created based on the first state signal to the mobile device UE.

The terminal device 200 may receive the second control signal created based on the driver's control command from the control device 100 and output an electric signal corresponding to the second control signal to the electronic device of the vehicle 1. Also, the terminal device 200 may acquire an electric signal exhibiting an operation state from the electronic device of the vehicle 1 and transmit the first state signal corresponding to the acquired electric signal to the control device 100.

The terminal devices 200 may be provided correspondingly to the electronic devices of the vehicle 1, respectively. For example, a first terminal device 200-1 may be provided correspondingly to the air conditioner 37, a second terminal device 200-2 may be provided correspondingly to the power window driving apparatus 41, and a third terminal device 200-3 may be provided correspondingly to the internal light 45. In addition, a fourth terminal device 200-4 may be provided correspondingly to the sunroof driving apparatus 46, and a fifth terminal device 200-5 may be provided correspondingly to the power seat driving apparatus 47.

The terminal device 200 may be disposed at a cable connected to the electronic device of the vehicle 1 or a connector connecting the electronic device of the vehicle 1 with the cable. Also, the terminal device 200 may be disposed at a printed circuit board (PCB) of the electronic device of the vehicle 1.

For example, the power window driving apparatus 41 may include a PCB on which various electronic parts constituting the power window driving apparatus 41 are mounted, be connected to a cable to receive the control signal, and include a connector to connect the cable with the PCB. The second terminal device 200-2 may be disposed at the connector, cable, or PCB of the power window driving apparatus 41 and electrically connected to the connector, cable, or PCB.

As a result, the terminal device 200 may output an electric signal to the electronic device of the vehicle 1 via the connector, cable, or PCB and may receive an electric signal input to the electronic device of the vehicle 1 via the connector, cable, or PCB.

For example, when the driver inputs the control command to raise the side window 18 via the mobile device UE as illustrated in FIG. 5, the second terminal device 200-2 may wirelessly receive a second control signal indicating the command to raise the side window 18 from the control device 100 and output an electric signal corresponding to the control command to raise the side window 18 to the power window driving apparatus 41 via the connector, cable, or PCB of the power window driving apparatus 41.

Also, when the driver inputs the control command to raise the side window 18 via the power window switch 14a, the second terminal device 200-2 may receive an electric signal indicating the command to raise the side window 18 via the connector, cable, or PCB of the power window driving apparatus 41.

As described above, the driver may input the control command for the electronic device of the vehicle 1 via the mobile device UE. In this regard, the control device 100 may receive the first control signal indicating the driver's control command from the mobile device UE and transmit the second control signal indicating the control command to the terminal device 200, wirelessly. Also, the terminal device 200 having received the second control signal may output the electric signal indicating the control command to the electronic device of the vehicle 1. Thus, the electronic device of the vehicle 1 may perform operation in accordance with the control command input by the driver.

Also, the driver may input a control command to control the electronic device via an input device of the vehicle 1. In the instant case, the terminal device 200 may acquire an electric signal indicating a driver's control command from the electronic device of the vehicle 1 and transmit a first state signal indicating an operation state of the electronic device to the control device 100. Also, the control device 100 having received the first state signal may transmit a second state signal indicating the operation state of the electronic device to the mobile device UE. The mobile device UE may display the operation state of the vehicle 1 to the driver.

Hereinafter, configurations of the control device 100 and the terminal device 200 will be described.

Figure 6:
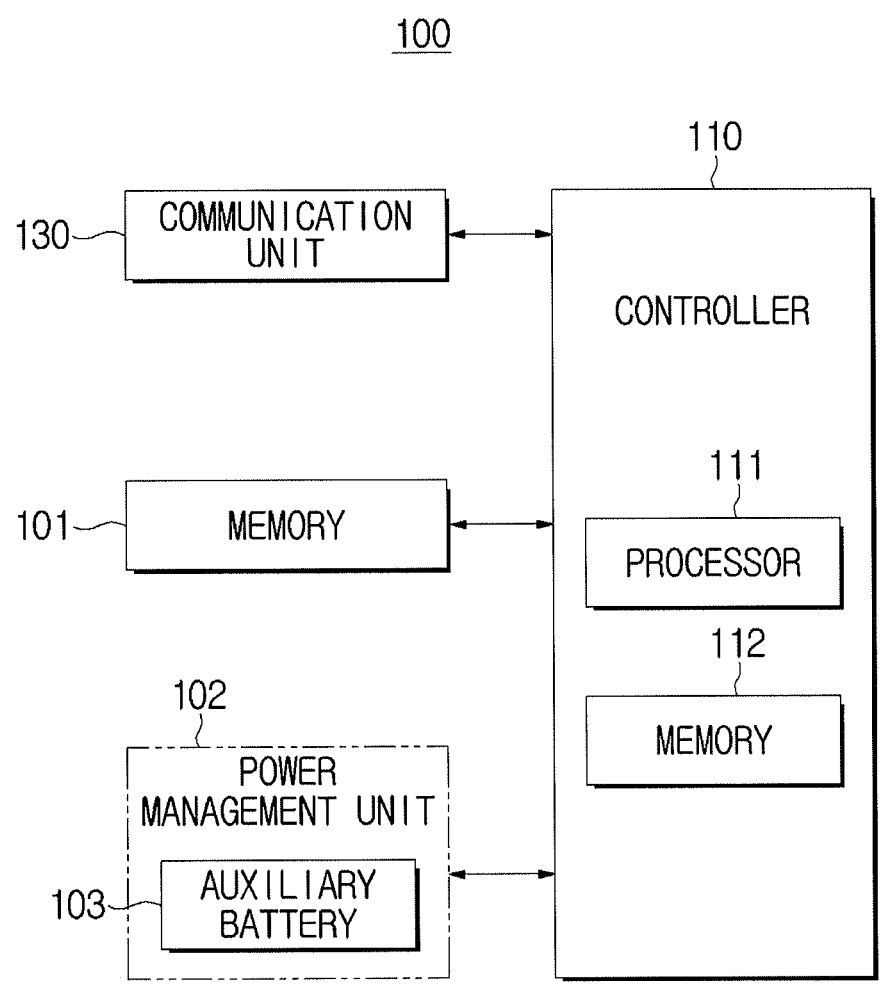
FIG. 6 is a block diagram of a control device of a vehicle according to an embodiment.

FIG. 6 is a block diagram of a control device of a vehicle according to an embodiment.

As illustrated in FIG. 6, the control device 100 may include a communication device 130 configured to transmit/receive signals to/from the mobile device UE and the plurality of terminal devices 200, a memory 101 configured to perform data backups by storing data of a controller 110, a power management device 102 including an auxiliary battery 103 and supplying power to operate the controller 110 using the auxiliary battery 103, and the controller 110 configured to control operation of the control device 100.

The communication device 130 may include an antenna configured to emit radio frequency (RF) signals to a free space and receive RF signals from the free space, and a transceiver configured to modulate signals to be transmitted into RF signals and demodulate the RF signals.

The antenna may receive an RF signal including the first control signal, and the transceiver may demodulate the RF signal received by the antenna into the first control signal. Also, the transceiver may modulate the second state signal to be transmitted via the antenna into the RF signal, and the antenna may transmit the RF signal including the second state signal.

As described above, the communication device 130 may receive the first control signal from the mobile device UE and transmit the second state signal to the mobile device UE. In the instant case, the first control signal may include a target code indicating a target receiver and a command code indicating a control command, and the second state signal may include a source code indicating a transmitter source and state data indicating an operation state. In addition, the first control signal and the second state signal may be encoded in accordance with predetermined protocols.

Also, the communication device 130 may transmit/receive signals to/from the mobile device UE using various communication protocols. For example, the communication device 130 may transmit/receive signals to/from the mobile device UE via Wi-Fi (IEEE 802.11), Bluetooth (IEEE 802.15.1), Zigbee (IEEE 802.15.4).

In addition, the transceiver may demodulate the second control signals to be transmitted to the plurality of terminal devices 200 into RF signals and the antenna may transmit the RF signals modulated by the transceiver to the plurality of terminal devices 200. Also, the antenna may receive RF signals including first state signals from the plurality of terminal devices 200, and the transceiver may demodulate the RF signals received from the plurality of terminal devices 200 into the first state signals.

As described above, the communication device 130 may transmit the second control signals derived from the first control signal to the plurality of terminal devices 200 and receive the first state signals regarding the electronic devices of the vehicle 1 from the plurality of terminal devices 200. In the instant case, the second control signal may include the target code indicating the target receiver and the command code indicating the control command, and the first state signal may include the source code indicating the transmitter source and state data indicating the operation state. Also, the second control signal and the first state signal may be encoded in accordance with predetermined protocols.

The communication device 130 may transmit/receive signals to/from the plurality of terminal devices 200 using various communication protocols. For example, the communication device 130 may transmit/receive signals to/from the plurality of terminal devices 200 via Wi-Fi (IEEE 802.11), Bluetooth (IEEE 802.15.1), Zigbee (IEEE 802.15.4).

The controller 110 may include a memory 112 configured to store programs and data, and a processor 111 configured to process data using the programs stored in the memory 112.

The memory 112 store programs and data to control operation of the control device 100 or store the first control signal, the second control signal, the first state signal, and the second state signal. The memory 112 may include volatile memories including Static Random Access Memory (S-RAM) and Dynamic Random Access Memory (DRAM) and non-volatile memories including Read Only Memory (ROM), Erasable Programmable Read Only Memory (EPROM), Electrically Erasable Programmable Read Only Memory (EEPROM), and flash memory.

The processor 111 may process the first control signal received via the communication device 130 by using the programs and data stored in the memory 112 and create the second control signal to be transmitted via the communication device 130.

For example, the processor 111 may create the second control signal including a target code indicating a target electronic device and a command code indicating a control command in accordance with the target electronic device and the content of controlling indicated by the first control signal received via the communication device 130. In the instant case, the processor 111 may encode the target code and the command code.

Also, the processor 111 may process the first state signal and create the second state signal.

The processor 111 and the memory 112 of the controller 110 may be implemented as a single chip or separate chips.

As described above, the controller 110 may create the second control signal by processing the first control signal received from the mobile device UE and transmit the second control signal to the plurality of terminal devices 200. Also, the controller 110 may create the second state signal by processing the first state signal received from the plurality of terminal devices 200 and transmit the second state signal to the control device 100.

In other words, the controller 110 may control each of the elements of the control device 100 to transmit RF signals to the plurality of terminal devices 200 in accordance with the control command received from the mobile device UE.

The memory 101, like the memory 112 of the controller 110, may also include volatile memories including S-RAM and DRAM and non-volatile memories including ROM, EPROM, EEPROM, and flash memory.

The memory 101 may perform a backup of main data related to control of the electronic devices by downloading a part or all of data stored in the memory 112 of the controller 110 from the memory 112 of the controller 110 and storing the data. When the ignition of the vehicle is turned on and power is supplied from a main power source P of the vehicle, the power management device 102 downloads data stored in the memory 112 of the controller 110 to the memory 101 for a backup of data of the controller 110.

Meanwhile, power needs to be supplied to the controller 110 to remotely control the vehicle even when the ignition of the vehicle is turned off. However, the remote control of the vehicle via the mobile device UE is performed at an unspecified time, continuous supply of power to the controller 110 may cause a full discharge of a battery of the vehicle.

In addition, when functions of the controller 110 are deactivated due to various reasons, data stored in the controller 110 may be lost. To prevent data loss, a separate server is constructed and a data backup is performed via external communication networks. However, the use of the separate server may not be safe from hacking and may result in network resource waste.

Figure 7:
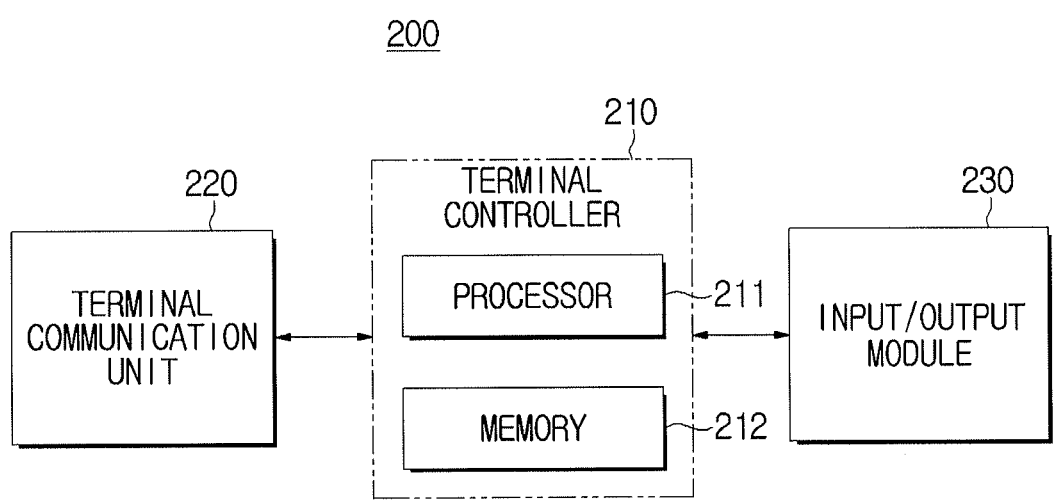
FIG. 7 is a block diagram of a terminal device included in a vehicle control system according to an embodiment.

Thus, the power management device 102 including the auxiliary battery 103 according to an exemplary embodiment may prevent the hacking and network resource waste. The power management device 102 will be described in more detail later. FIG. 7 is a block diagram of a terminal device included in a vehicle control system according to an embodiment.

As illustrated in FIG. 7, the terminal device 200 may include a terminal communication device 220 configured to transmit/receive signals to/from the control device 100, a terminal controller 210 configured to control operation of the terminal device 200, and an input/output module 230 configured to output an electric signal to the electronic device of the vehicle 1 and receive an electric signal output from the electronic device.

The terminal communication device 220 may include an antenna configured to emit RF signals to the free space and receive RF signals from the free space, and a transceiver configured to modulate signals to be transmitted into RF signals and demodulate the RF signals.

The antenna may receive the RF signal including the second control signal, and the transceiver may demodulate the RF signal received by the antenna into the second control signal. Also, the transceiver may modulate the first state signal to be transmitted via the antenna into the RF signal, and the antenna may transmit the RF signal including the first state signal.

As described above, the terminal communication device 220 may receive the second control signal from the control device 100 and transmit the first state signal to the control device 100. In the instant case, the second control signal may include a target code indicating a target receiver and a command code indicating a control command, and the first state signal may include a source code indicating a transmitter source and state data indicating an operation state. In addition, the second control signal and the first state signal may be encoded in accordance with predetermined protocols.

The terminal communication device 220 may transmit/receive signals to/from the control device 100 using various communication protocols. For example, the communication device 130 may transmit/receive signals to/from the control device 100 via Wi-Fi (IEEE 802.11), Bluetooth (IEEE 802.15.1), Zigbee (IEEE 802.15.4).

The terminal controller 210 may include a memory 212 configured to store programs and data, and a processor 211 configured to process data using the programs stored in the memory 212.

The memory 212 stores programs and data to control operation of the terminal device 200 or store the second control signals and the first state signals. The memory 212 may include volatile memories including S-RAM and DRAM and non-volatile memories including ROM, EPROM, EEPROM, and flash memory.

The processor 211 may process the second control signal received via the terminal communication device 220 by using the programs and data stored in the memory 212 and create the electric signal to be transmitted via the input/output module 230.

For example, the processor 211 may determine whether the target code included in the control signal is the same as a prestored target code. When the target code included in the control signal is the same as the prestored target code, the processor 211 may create an electric signal corresponding to the command code. When not, the processor 211 may not create the electric signal.

Also, the processor 211 may process the electric signal acquired via the input/output module 230 and create the first state signal to be transmitted via the terminal communication device 220.

The processor 211 and the memory 212 of the terminal controller 210 may be implemented as a single chip or separate chips.

As described above, the terminal controller 210 may create the electric signal to control the electronic device of the vehicle 1 by processing the second control signal received via the internal plate 220. Then, the terminal controller 210 may output the created electric signal to the electronic device of the vehicle 1 via the input/output module 230.

The terminal controller 210 may determine the target of the control signal based on the target code included in the control signal. When the target code indicates an electronic device connected to the terminal device 200, the terminal controller 210 may create an electric signal to control the electronic device in accordance with the command code. In addition, when the target code does not indicate the electronic device connected to the terminal device 200, the terminal controller 210 may ignore the received control signal. In other words, the terminal controller 210 may control each of the elements of the terminal device 200 to output the electric signal to the electronic device of the vehicle 1 in accordance with the control signal received from the control device 100.

Also, the terminal controller 210 may acquire the electric signal from the electronic device of the vehicle 1 via the input/output module 230 and create the first state signal by processing the acquired electric signal. Then, the terminal controller 210 may transmit the first state signal to the control device 100 via the terminal communication device 220.

The input/output module 230 may provide the electric signal created by the terminal controller 210 to the electronic device of the vehicle 1 via the connector, cable, or PCB and acquires the electric signal output from the electronic device of the vehicle 1 via the connector, cable, or PCB.

As described above, the mobile device UE may transmit/receive the first control signal and the second state signal to/from the control device 100, and the control device 100 may transmit/receive the second control signal and the first state signal to/from the terminal device 200.

The first control signal, the second control signal, the first state signal, or the second state signal may be encoded to enhance security of wireless communications.

Figure 8:
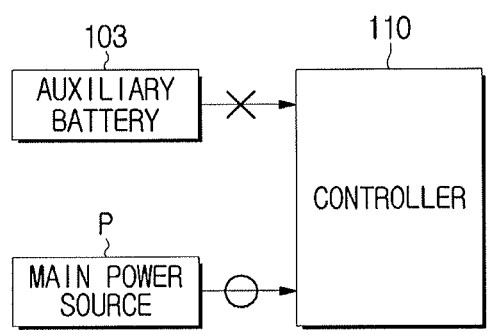
FIG. 8 is a diagram illustrating power sources varying in accordance with the state of a vehicle according to an embodiment.
Figure 8:
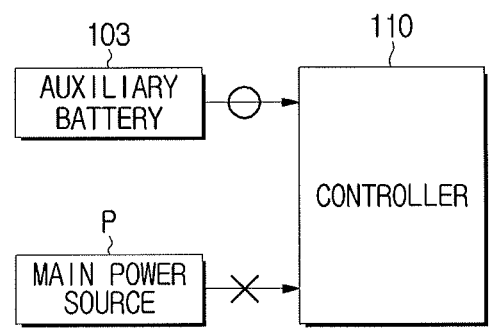
Figure 8:
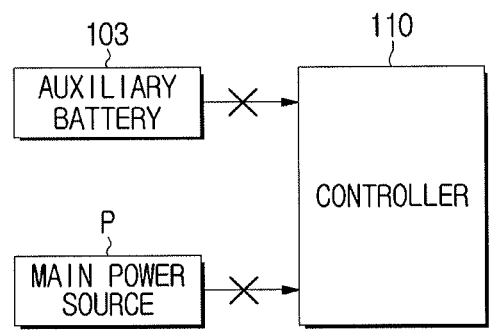
Figure 8:
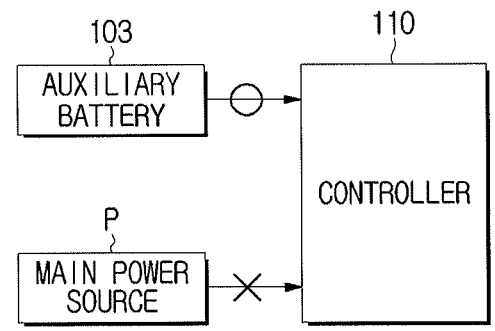

Hereinafter, supply of power using the auxiliary battery 103 by the power management device 102 will be described. FIG. 8 is a diagram illustrating power sources varying in accordance with the state of a vehicle according to an embodiment.

When the ignition of the vehicle is turned on, power is supplied from the main power source P to the controller 110.

When the ignition of the vehicle is turned on and the vehicle is running as illustrated in (a) of FIG. 8, power is supplied from the main power source P of the vehicle to the controller 110, and the auxiliary battery 103 is switched to a charging state.

After the ignition of the vehicle is turned off, the power management device 102 performs a backup of data of the controller 110 by downloading a part or all of data stored in the controller 110 to the memory 101. The power management device 102 may download data related to a target electronic device for remote control to the memory 101 among data stored in the controller 110.

Meanwhile, functions of the controller 110 may be deactivated due to various reasons. In the instant case, data stored in the controller 110 may be lost. When the functions of the controller 110 are deactivated, the power management device 102 may reboot the controller 110 by supplying power to the controller 110 using the auxiliary battery 103. When data of the controller 110 is lost, the power management device 102 may upload the backup data stored in the memory 101 to the controller 110 to restore the lost data. Unexpected deactivation of functions and data loss may be efficiently dealt with by performing the backup of data of the controller 110 while the vehicle is running.

Meanwhile, when the ignition of the vehicle is turned off, the power management device 102 supplies power to the controller 110 using the auxiliary battery 103 instead of using the main power source P as illustrated in FIG. 8. The controller 110 may perform predetermine operation after the ignition of the vehicle is turned off by receiving power from the auxiliary battery 103. For example, the controller 110 may clean up logfiles or perform operation including outputting of a goodbye message or music by receiving power from the auxiliary battery 103.

After the ignition of the vehicle is turned off and the controller 110 completes the operation, the power management device 102 blocks the supply of power from the auxiliary battery 103 to the controller 110 to turn off the controller 110 as illustrated in FIG. 8.

The power management device 102 may supply power to the communication device 130 to receive a signal from the mobile device UE in a case of remote control of the vehicle that may be performed at an unspecified time.

When the power manager 102 detects an approach of the mobile device UE or recognizes the receipt of a control signal from the mobile device UE as the communication device 130 receives a signal from the mobile device UE, the power management device 102 may boot up the controller 110 by supplying power to the controller 110 using the auxiliary battery 103.

After booted up, the controller 110 may control an electronic device related to a function corresponding to the signal received from the mobile device UE. For example, when the mobile device UE is located within a predetermine detecting range, the controller 110 may control an electronic device related to a predetermined function, e.g., called welcome function. Alternatively, when the control signal indicating a command to raise the side window is received as illustrated in FIG. 5, the controller 110 may transmit a control signal to the second terminal device 200-2 to raise the side window.

When the ignition of the vehicle is turned on, again, the power management device 102 blocks the supply of power from the auxiliary battery 103 and the auxiliary battery 103 is switched to a charging state as illustrated in (a) of FIG. 8. The controller 110 receives power from the main power source P of the vehicle.

Hereinafter, a method of controlling a vehicle to manage the supply of power to the controller 110 will be described. FIG. 9 and FIG. 10 are flowcharts illustrating a method of controlling a vehicle according to an embodiment.

Referring to FIG. 9, when the ignition of the vehicle is turned off (800), the auxiliary battery 103 supplies power to the controller 110 (810). When the controller 110 competes predetermine operation (820), the power management device 102 blocks the supply of power from the auxiliary battery 103 to the controller 110 (830).

When the ignition of the vehicle is turned off, the power management device 102 supplies power, which has been supplied from the main power source P to the controller 110, to the controller 110 using the auxiliary battery 103 as illustrated in (b) of FIG. 8. The controller 110 performs predetermined operation expected to be performed after the ignition of the vehicle is turned off upon receiving power from the auxiliary battery 103. For example, the controller 110 may clean up logfiles or perform operation including outputting of a goodbye message or music by receiving power from the auxiliary battery 103.

After the ignition of the vehicle is turned off and the controller 110 completes the operation, the power management device 102 blocks the supply of power from the auxiliary battery 103 to the controller 110 to turn off the controller 110 as illustrated in (c) of FIG. 8.

When the communication device 130 receives a signal from the mobile device UE (840), the power management device 102 supplies power to the controller 110 using the auxiliary battery 103 (850). The controller 110, which receives power from the auxiliary battery 103, is booted up and controls the vehicle in accordance with the signal received from the communication device 130 (870).

The power management device 102 may supply power to the communication device 130 to receive a signal from the mobile device UE in a case of remote control of the vehicle that may be performed at an unspecified time.

When the power manager 102 detects an approach of the mobile device UE or recognizes the receipt of a control signal from the mobile device UE as the communication device 130 receives a signal from the mobile device UE, the power management device 102 may boot up the controller 110 by supplying power to the controller 110 using the auxiliary battery 103.

After booted up, the controller 110 may control an electronic device related to a function corresponding to the signal received from the mobile device UE. For example, when the mobile device UE is located within a predetermine detecting range, the controller 110 may control an electronic device related to a predetermined function, e.g., called welcome function. Alternatively, when a control signal indicating a command to raise the side window is received as illustrated in FIG. 5, the controller 110 may transmit a control signal to the second terminal device 200-2 to raise the side window.

Next, referring to FIG. 10, when the ignition of the vehicle is turned on (880), the main power source P of the vehicle supplies power to the controller 110, and the auxiliary battery 103 is switched to a charging state (890). When the ignition of the vehicle is turned on, the power management device 102 may perform a backup of data of the controller 110 by downloading the data of the controller 110 to the memory 101 (900).

When the ignition of the vehicle is turned on, the controller 110 receives power from the main power source P of the vehicle. When the ignition of the vehicle is turned on and the vehicle is running as illustrated in (a) of FIG. 8, the main power source P of the vehicle supplies power to the controller 110, and the auxiliary battery 103 is switched to a charging state.

After the ignition of the vehicle is turned off, the power management device 102 performs a backup of data of the controller 110 by downloading a part or all of data stored in the controller 110 to the memory 101. The power management device 102 may download data related to a target electronic device for remote control to the memory 101 among data stored in the controller 110.

Meanwhile, when functions of the controller 110 are deactivated (910), the power management device 102 reboots the controller 110 by supplying power to the controller 110 using the auxiliary battery 103 (920) and restores data of the controller 110 by using the backup data (930).

The functions of the controller 110 may be deactivated due to various reasons. In the instant case, data stored in the controller 110 may be lost. When the functions of the controller 110 are deactivated, the power management device 102 may reboot the controller 110 by supplying power to the controller 110 using the auxiliary battery 103. When data of the controller 110 is lost, the power management device 102 may upload the backup data stored in the memory 101 to the controller 110 to restore the lost data. Unexpected deactivation of functions and data loss may be efficiently dealt with by performing a backup of data of the controller 110 while the vehicle is running.

As is apparent from the above description, according to the vehicle and the method of controlling the same according to the embodiments of the present invention, remote control of electronic devices of the vehicle may be possible individually or integrally.

According to the vehicle and the method of controlling the same according to the embodiments of the present invention, full discharge of the main power source of the vehicle may be prevented during remote control of electronic devices of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
 a communication device configured to receive a control signal indicating a control command from a mobile device;
 a controller configured to control a target of control based on the control signal;
 a memory configured to perform a backup of data of the controller; and
 a power management device including an auxiliary battery and configured to supply power to the controller using the auxiliary battery when the communication device receives the control signal while an ignition of the vehicle is turned off,
 wherein when functions of the controller are deactivated and data stored in the controller is lost, the power management device boots the controller by supplying power to the controller using the auxiliary battery and uploads the lost data based on the data stored in the memory to the controller.

2. The vehicle according to claim 1, wherein the controller receives power from a main power source of the vehicle when the ignition of the vehicle is turned on.

3. The vehicle according to claim 1, wherein the power management device blocks a supply of power from the auxiliary battery when the ignition of the vehicle is turned on.

4. The vehicle according to claim 1, wherein the power management device switches the auxiliary battery into a charging state when the ignition of the vehicle is turned on.

5. The vehicle according to claim 1,
 wherein the power management device is configured to download data related to control of the vehicle from the controller and to store the data in the memory while the ignition of the vehicle is turned on.

6. The vehicle according to claim 1, wherein when the controller is deactivated, the power management device is configured to boot the controller by supplying power to the controller using the auxiliary battery.

7. The vehicle according to claim 1, wherein when the communication device receives the control signal while the ignition of the vehicle is turned off, the power management device is configured to boot the controller by supplying power to the controller using the auxiliary battery.

8. The vehicle according to claim 1, wherein the power management device supplies power to the controller using the auxiliary battery until the controller completes predetermined operation and blocks the supply of power to the controller upon completion of the operation while the ignition of the vehicle is turned off.

9. A method of controlling a vehicle, the method comprising:
 determining whether or not a control signal is received from a mobile device when an ignition of the vehicle is turned off; and
 supplying power from an auxiliary battery to a controller of the vehicle by a power management device of the vehicle,
 wherein the method further includes:
  booting the controller by supplying power to the controller using the auxiliary battery by the power management device and uploading the lost data based on the data stored in the memory to the controller by the power management device, when functions of the controller are deactivated and data stored in the controller is lost.

10. The method according to claim 9, further comprising supplying power from a main power source to the controller when the ignition of the vehicle is turned on.

11. The method according to claim 9, further comprising blocking a supply of power from the auxiliary battery by the power management device when the ignition of the vehicle is turned on.

12. The method according to claim 9, further comprising switching the auxiliary battery to a charging state when the ignition of the vehicle is turned on.

13. The method according to claim 9, further comprising downloading data related to control of the vehicle from the controller by the power management device of the vehicle and storing the data in the memory when the ignition of the vehicle is turned on.

14. The method according to claim 9, further comprising booting the controller by supplying power to the controller using the auxiliary battery by the power management device when the controller are deactivated.

15. The method according to claim 9, wherein the supplying of power to the controller of the vehicle comprises booting the controller by supplying power to the controller using the auxiliary battery by the power management device of the vehicle upon receiving the control signal from the mobile device.

16. The method according to claim 9, further comprising:
    supplying power to the controller using the auxiliary battery until the controller completes predetermined operation by the power management device; and
    blocking the supply of power to the controller upon completion of the operation by the power management device, while the ignition of the vehicle is turned off.

* * * * *